Feb. 27, 1934.  R. C. FULLER  1,949,157
ABSORPTION REFRIGERATING APPARATUS
Filed Oct. 25, 1932      3 Sheets-Sheet 1

Inventor
RAYMOND C. FULLER
By Mason Fenwick & Lawrence
Attorneys

Feb. 27, 1934.    R. C. FULLER    1,949,157
ABSORPTION REFRIGERATING APPARATUS
Filed Oct. 25, 1932    3 Sheets-Sheet 2
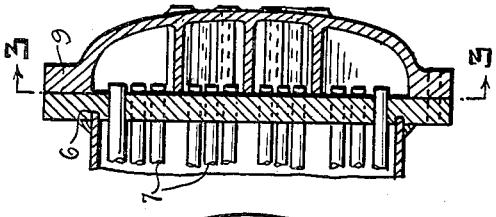
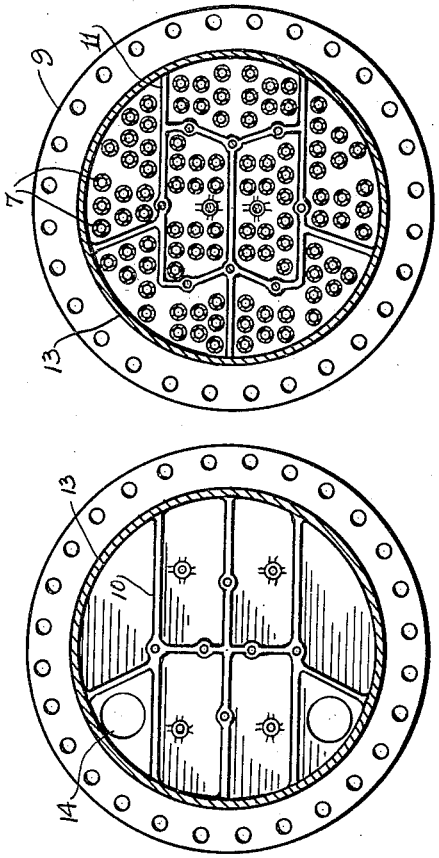
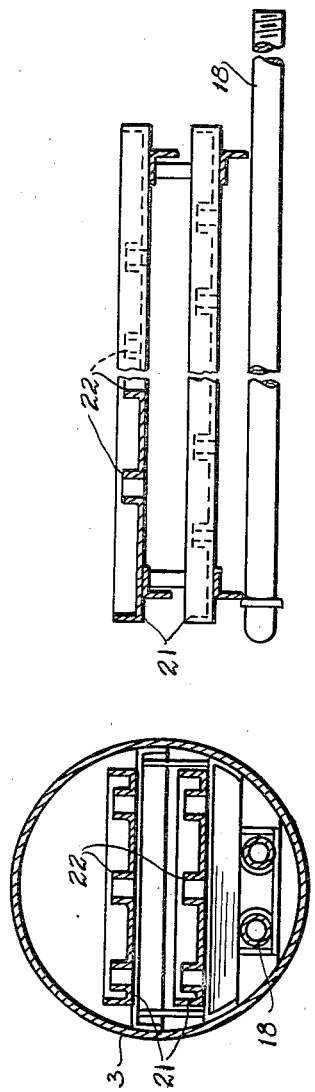
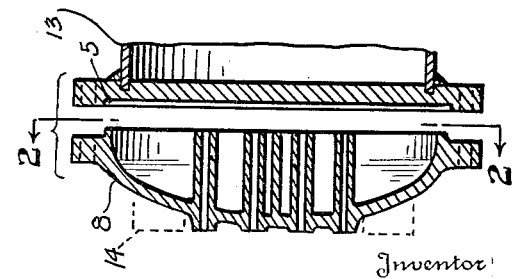
Inventor
RAYMOND C. FULLER
By Mason Fenwick & Lawrence
Attorneys Feb. 27, 1934.  R. C. FULLER  1,949,157
ABSORPTION REFRIGERATING APPARATUS
Filed Oct. 25, 1932   3 Sheets-Sheet 3
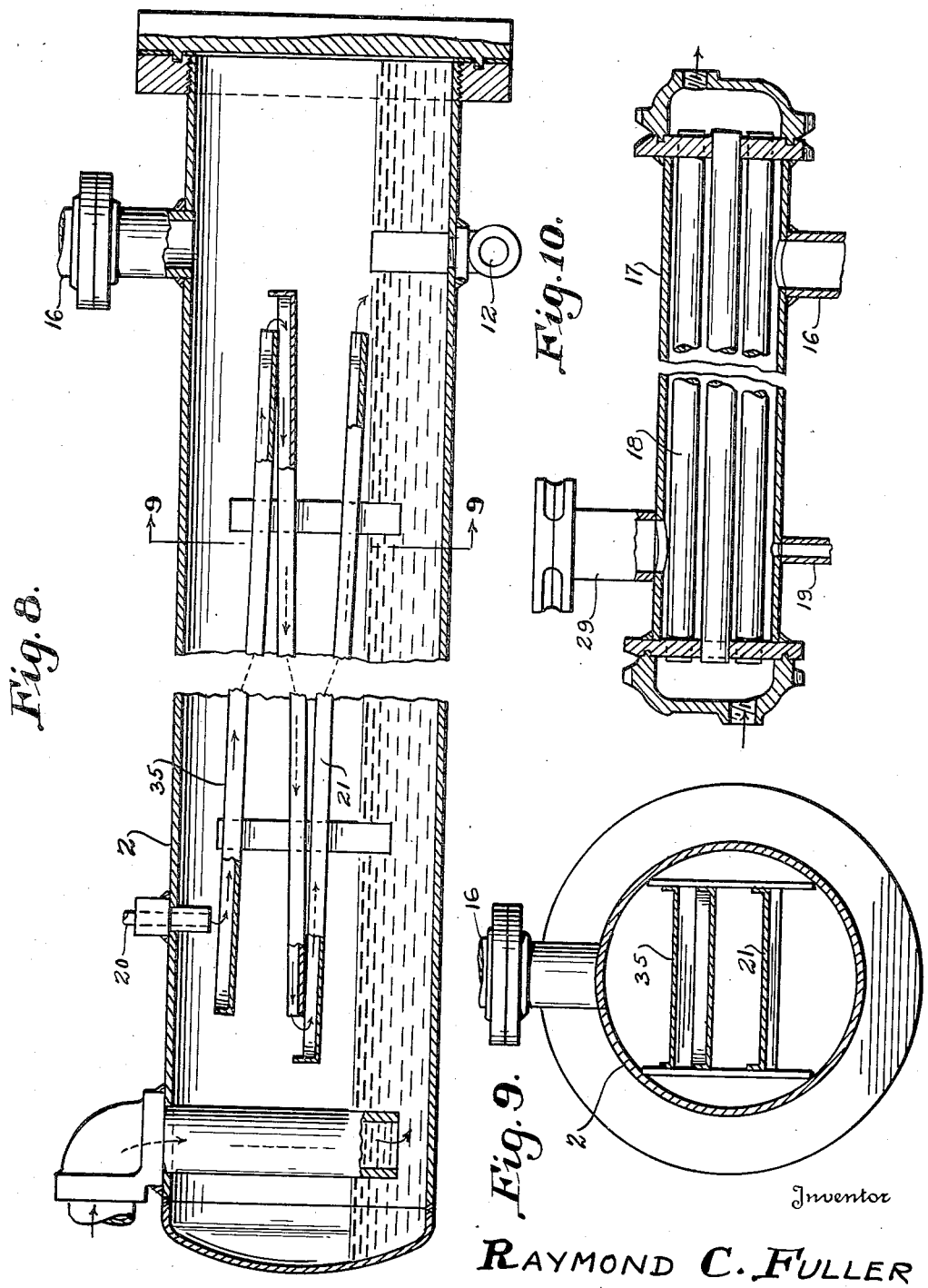
Inventor
RAYMOND C. FULLER
By Mason Fenwick Lawrence
Attorneys Patented Feb. 27, 1934

1,949,157

UNITED STATES PATENT OFFICE 1,949,157

ABSORPTION REFRIGERATING APPARATUS

Raymond Chester Fuller, Louisville, Ky., assignor to Henry Vogt Machine Co. Inc., Louisville, Ky., a corporation of Kentucky Application October 25, 1932. Serial No. 639,502

7 Claims. (Cl. 62—119)

This invention relates to refrigeration apparatus particularly adapted to an absorption system of that type in which heat conservation is consistently practiced by arranging in heat exchanging relationship those parts of the system which are rendered more efficient by respective heating or cooling.

The general object of the invention is the improvement in apparatus of the type described characterized by efficiency in operation, economy in construction, and simplicity in design.

One of the more specific objects of the invention is the provision of a generator following the construction of a tubular boiler, in which the refrigerant solution is circulated through the tubes, and the heating medium occupies the boiler space, the lack of expansion space in the boiler tubes for the released gaseous refrigerant necessitating that the generator be associated with an auxiliary tank or "analyzer" in which the heated liquid in the generator is carried at a determined level and permitted to boil out the refrigerant into the space within the analyzer above the level of the liquid.

Another object of the invention is the provision of auxiliary heating means for the if required, body of refrigerant solution in the analyzer to compensate for the heat losses due to the adiabatic expansion of the refrigerant gas coming out of the liquid solution.

A further object of the invention is to provide a rectifier in combination with the analyzer for receiving the refrigerant gas from the analyzer and condensing out the entrained water, which water is fed back to the analyzer by gravity. Since the water is not fed back pure but unavoidably charged with absorbed refrigerant gas, the invention contemplates the provision of means in the analyzer for receiving the aqueous condensate from the rectifier and freeing it from its content of refrigerant gas, which gas joins the body of gas in the analyzer.

Other objects of the invention will appear as the following description of a preferred and other practical embodiments thereof proceeds.

In the drawings which accompany and form a part of the specification and throughout the several figures of which the same characters of reference have been employed to designate identical parts:

Figure 1 is a diagrammatic representation of a regenerative refrigeration system of the absorption type, the three elements to which the present improvements relate being shown structurally and in longitudinal section;

Figures 2 and 3 are end views of the generator, taken respectively along the lines 2—2 of Figure 4 and 3—3 of Figure 5;

Figure 4 is a longitudinal section through one end of the generator showing the header; and Figure 5 is a similar view through the opposite end showing the opposite header;

Figure 6 is a cross section through the analyzer, taken along the line 6—6 of Figure 1;

Figure 7 is a longitudinal elevation partly in section showing the trays and steam pipes within the analyzer;

Figure 8 is a longitudinal section through a modified form of analyzer;

Figure 9 is a section taken along the line 9—9 of Figure 8; and

Figure 10 is a longitudinal section through the rectifier.

Figure 1:
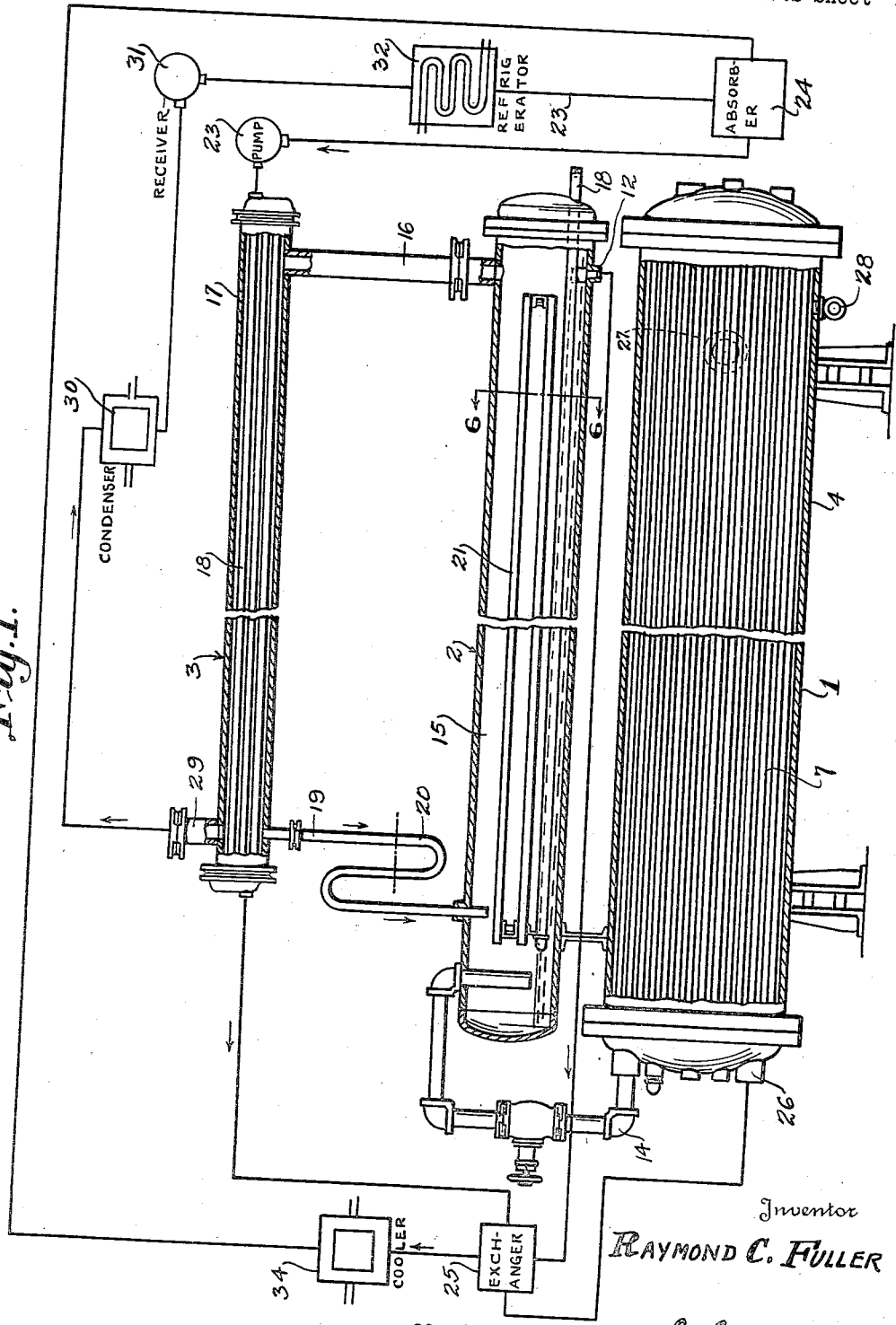

Referring now in detail to the several figures, and first adverting to the general lay-out shown in Figure 1, the numeral 1 represents the generator, 2 the analyzer and 3 the rectifier, these elements being shown connected into a known absorption system of refrigeration in which heat interchange is practiced at all points where possible in order to heat those parts of the system which it is advantageous to heat by means of heat taken from other parts of the system which should be cooled and whose heat would otherwise be wasted.

It is old to employ a generator of substantially identical construction to the one herein shown, but the method of employing it as disclosed in the present invention, is so different as to require the provision of the analyzer 2.

The rectifier 3 is also old in construction, but its location with regard to the analyzer is new and the functions thereof eventuating from its location with respect to the analyzer are novel and therefore bind the rectifier and analyzer into an inseparable combination.

Referring in detail to the generator, it comprises in the illustrated embodiment, a boiler 4 having heads 5 and 6, see Figures 4 and 5, and tubes 7 which open into said heads. The ends of the tubes are enclosed within headers 8 and 9, said tubes being preferably grouped in multiples of any desired number and the headers 8 and 9 being provided with baffles 10 and 11, said baffles being so disposed as to provide a number of passes in the headers for the ends of the tubes. Thus in the illustrative embodiment of the invention, the tubes are arranged in multiples of seven and the baffles being so arranged that there are fourteen passes. The arrangement of tubes is entirely optional however and in no wise affects the status of the invention.

In the old use of a similar boiler in a refrigerating system, the refrigerant solution was contained in the boiler, and the steam for heating it passed through the tubes. This had several disadvantages among which being the fact that as the refrigerant gas was boiled out of the liquid solution, the level of the liquid solution descended so that some of the heating tubes were exposed. This of course has the effect of diminishing the capacity of the generator. Furthermore, it was necessary to use a larger volume of refrigerant solution for a given refrigerating capacity and in consequence, the apparatus had to be made larger and heavier. In view of the larger volume of refrigerant carried in the generator, it was necessary in putting the generator into action to consume more of the heating medium and for a greater period of time.

In carrying out the present invention, the functions of the generator are reversed. The refrigerant solution is passed through the tubes and the steam for heating introduced into the boiler space. There can be no exposure of tubes within the boiler since the steam being expansible, fills the space around the tubes whilesoever there is any steam at all present. Furthermore, it is possible to pump the refrigerant solution in a positive manner through the tubes with as great a velocity as may be desired, thus quickening the rate of heat interchange so that for the same refrigerating capacity, it is possible to operate on a smaller quantity of refrigerant solution and in consequence, to reduce the size of the apparatus, all these factors being in the interest of economy and efficiency.

It will be understood however that since the refrigerant solution necessarily fills the tubes within the boiler, there is no space for the reception of the gaseous refrigerant given off by the boiling. Consequently, the present invention provides the analyzer 2 for this purpose. Said analyzer comprises a cylindrical tank which may occupy any desired position with respect to the generator. It is therefore not necessary that the analyzer be above the generator as shown, this being merely a matter of convenience or choice. The analyzer has an overflow pipe 12 extending into the chamber of the analyzer for a height which determines the liquid level within the analyzer.

The final group of tubes indicated at 13 in Figure 3 is in communication with a pipe 14 which communicates with the analyzer preferably at its upper part as shown, and extends through the chamber of said analyzer substantially down to the liquid level therein. The refrigerant solution passes into the analyzer at boiling temperature, and the gaseous refrigerant escapes therefrom, filling the space 15 above the liquid level. Said gas acquires a pressure which sends it through the riser 16 into the rectifier 17.

Rapid evolution of the gaseous refrigerant from the body of liquid in the lower part of the analyzer may cause a lowering of the temperature of said liquid through adiabatic expansion of the gas to such an extent as to retard or inhibit the further evolution of gas. In order to compensate for such heat loss, a steam coil 18 is extended through the analyzer below the normal liquid level.

The object of the rectifier is to separate aqueous moisture from the gaseous refrigerant. In the present invention, this moisture is returned to the analyzer by gravity, necessitating that the rectifier be placed above and preferably substantially in a vertical plane with respect to the analyzer. The rectifier comprises a series of tubes 18 through which relatively cool strong refrigerant solution is passed as will appear later when the operation of the entire system is described. The hot refrigerant gas together with the entrained aqueous moisture occupies the space within the rectifier, surrounding said tubes. Through heat interchange between the hot gaseous refrigerant, and the cool strong refrigerant solution within the tubes, the temperature of the hot gaseous refrigerant is sufficiently lowered to condense the moisture which falls to the bottom of the rectifier and drains through the discharge pipe 19, the lower wall of the rectifier inclining toward the discharge pipe, for this purpose. Said condensed moisture is not returned to the analyzer in pure state for it has an avidity for the refrigerant gas and therefore is strongly charged with said gas. The pipe 19 is bent to form a trap 20 as shown, in which sufficient of the condensed moisture accumulates to form a column which prevents the hot gaseous refrigerant from the analyzer forcing its way into the rectifier by way of the discharge pipe 19, preventing the latter performing its function as a drain pipe.

The lower end of the discharge pipe 19 extends into the chamber 15 of the analyzer and discharges its contents upon the uppermost of a series of superposed trays 21. These trays are located above the liquid level within the analyzer. They are shallow so as to spread the aqueous moisture out into relatively thin sheets or films, and the trays are provided at intervals with upstanding apertured bosses 22 through which the liquid in the upper tray overflows into the tray or trays beneath, and the lower tray overflows into the body of liquid in the lower part of the analyzer. The aqueous condensate, thus spread out is thoroughly heated, either by the native temperature of the hot refrigerant gas, acquired through its boiling in the generator 1, or enhanced by the heating by the steam pipe 18. The aqueous condensate thus heated gives up its content of gaseous refrigerant which joins the main body of gas in the upper part of the analyzer.

That which is new having now been described, its relation to the complete refrigeration system will now be traced: The pump 23 draws cold strong refrigerant solution from an absorbing tank 24 which may be cooled in any suitable manner as by a water jacket. The pump drives the cold strong solution through the tubes 18 of the rectifier cooling the hot gaseous refrigerant which occupies the space within the rectifier outside of said tubes and in heat exchanging relationship therewith. The cold strong refrigerant solution is thus warmed to an extent and passes out from the rectifier as a warm liquid. On its way to the generator it receives a further accretion of heat in the heat exchanger 25 through which hot weak liquid from the analyzer flows, said liquid being cooled and giving up its heat to the warm refrigerant solution which thereby becomes hot. In heated state, it is introduced into the anterior end 26 of the tubular system within the generator. Here it is made to boil by steam admitted to the generator in any suitable manner as for example, by way of the steam inlet 27. The condensate from the steam may be drained away through the outlet 28.

It has been related how the hot refrigerant solution, raised substantially to the boiling point, leaves the generator by way of the pipe 14 and enters the analyzer, the liquid level therein being maintained by the height of the pipe 12. The hot refrigerant gas is herein evolved and passed through the pressure of its generation into the rectifier. It is here cooled by giving up its heat to the cold strong refrigerant solution, as has been described and passes by way of the conduit 29 to a condenser 30 which is preferably water cooled and in which the cooled gaseous refrigerant becomes transformed to the state of a liquid. The cool liquid refrigerant then passes into a receiver 31 from which it is supplied to the refrigerator 32 according to the needs of the latter. In said refrigerator, the liquid refrigerant is once again gasified, acquiring heat and it passes to the absorber 24 by way of the pipe 23 as a somewhat warm refrigerant gas.

Adverting once again to the analyzer, the hot liquid, deprived of the major portion of the refrigerant gas in the analyzer, passes by way of the overflow pipe 12 to the heat exchanger 25 where it gives up some of its heat to the warm strong refrigerant solution on its way to the generator. The hot weak refrigerant solution thus cooled has its temperature still further reduced in a cooler 34, preferably water jacketed, and the cold weak refrigerant solution passes from there direct to the absorber where it is charged with the strong and somewhat warm gaseous refrigerant exhausting from the refrigerator.

In Figures 8 and 9, a modified form of analyzer is shown which may be similar in all respects to the analyzer 2, excepting that the trays 35 for receiving the aqueous condensate from the rectifier are imperforate and inclined baffle-like, so that the aqueous condensate runs to the lower end of the uppermost tray, drops upon the upper end of the intermediate tray, travels in reverse through to the lower end of this tray and drops upon the bottom tray where its direction of travel is again reversed. The object of causing the aqueous condensate to traverse a circuitous path is to heat it to the point at which it will give up its absorbed refrigerant.

One of the outstanding distinctions of the present invention from the prior art is the circulation of the strong refrigerant solution by positive pump action through the tubes of the generator instead of within the body of the shell, surrounding the tubes. On account of the more rapid passage of the refrigerant solution over the heat exchanging surfaces, the rate of heat interchange is greatly enhanced and therefore less heat surface per ton of refrigeration capacity is required. In the older types of generators, the refrigerant solution is in a relatively quiet state which is conducive to a relatively small rate of heat exchange.

In the former types of generators, that is to say, in a generator in which the refrigerant solution occupies the shell surrounding the tubes while the steam passes through the tubes, conditions are frequently such that the refrigerant solution recedes, exposing a considerable portion of the tube heating surface. This of course reduces the capacity of the generator. Obviously, it cannot happen in a generator operated according to the principles of the present invention. In view of the efficient heat interchanging capacity of the generator of the present invention, the refrigerant charge is considerably less than required for the older type of apparatus and consequently, for a given capacity, the weight of the generator may be made much less.

In view of the relatively small volume of the refrigerant at any one time within the generator, it requires much less time and fuel to put the generator into action. Furthermore, the circulation of the refrigerant through the tubes instead of around them, as formerly, permits such corrosion as may be caused by the refrigerant to be readily removed from the interior surfaces of the tubes merely by removing the headers and passing a turbining tool through the tubes. Under the old practice the corrosion forms on the outside of the tubes, where it is inaccessible to any means for its removal.

While the invention as above described and illustrated is particularly adapted for the employment of ammonia as a refrigerant, the invention is in no wise restricted to the use of this agent since other well known refrigerants may be employed as well, and such modifications of the structure and arrangement of parts as the use of such other refrigerants may necessitate will in no wise affect the scope of the invention as defined in the appended claims.

What I claim is:

1. Absorption refrigeration system including a generator having the construction of a tubular boiler, means for pumping strong refrigerant solution through the tubes, means for admitting steam to the boiler space surrounding said tubes for heating the refrigerant solution, and an analyzer with which said tubes communicate into which the heated strong solution passes, means for maintaining said heated strong solution at a determined level, at an intermediate height in said analyzer, the latter providing a chamber above said liquid level for receiving the gaseous refrigerant boiled out from said strong solution within said analyzer.

2. Absorption refrigeration system as claimed in claim 1, including auxiliary means in said analyzer for heating the body of strong solution within said analyzer.

3. Absorption refrigeration system including a generator, and an analyzer in which heated strong solution from said generator passes, and in which the gaseous refrigerant content of said solution is boiled out, a rectifier comprising a chamber and communicating with the gaseous body in said analyzer for receiving the same, heat interchange means within said rectifier through which a cooling medium passes for condensing out the water content of the gaseous refrigerant within said rectifier, the latter being positioned relative to said analyzer to return the water content to said analyzer by gravity, and a conduit communicating with said rectifier and analyzer and formed as a trap, through which said water content is returned to said analyzer.

4. Absorption refrigeration system including a generator and an analyzer in which heated strong solution from said generator passes, a rectifier above said analyzer providing a chamber in communication with the gaseous body within said analyzer for receiving the same, a conduit within said rectifier for bringing a cooling medium into heat exchanging relationship with the gaseous refrigerant in said rectifier for condensing out the moisture content therefrom, a conduit for returning said water content to said analyzer by gravity, and means within said analyzer for spreading said returned water content into a shallow body of relatively great surface extent subjecting it to the heat within said analyzer and enhancing the freedom of evaporation therefrom of its content of gaseous refrigerant.

5. Absorption refrigeration system as claimed in claim 4, the operating means within said analyzer comprising a series of superposed trays arranged baffle-like and discharging one into the other.

6. Absorption refrigeration system as claimed in claim 4, the operating means within said analyzer comprising a series of superposed trays, each having a plurality of overflow passages for discharging the contents of each but the lowest tray in the one next below and the lowest tray into the body of heated strong refrigerant solution in the lower part of said analyzer.

7. Absorption refrigeration system including a generator, an analyzer and a rectifier arranged in serial communication, the rectifier being above the analyzer and having a return communication with said analyzer, said generator having the construction of a tubular boiler, means for pumping strong refrigerant solution through the tubes, and means for admitting steam to the boiler space surrounding said tubes for heating the strong solution in said generator, means within said analyzer for maintaining at an intermediate height in said analyzer a constant level of the heated strong solution discharged from said generator through one of said serial connections, the space within said analyzer above said liquid level constituting a chamber for receiving the gaseous refrigerant boiled out of said heated strong solution within said analyzer, a system of superposed trays within said analyzer arranged to permit the contents to flow from one to another, serially downward, means within said rectifier for bringing a cooling medium into heat interchanging relation with the heated gaseous refrigerant entering said rectifier from said analyzer through the other serial connection, said return connection delivering the water content condensed out of the gaseous body in said rectifier to the uppermost of said system of trays, the latter spreading said water content into a shallow body of great surface extent for heating it and enhancing the freedom of evaporation of its content of gaseous refrigerant.

RAYMOND CHESTER FULLER.